R. B. REDDING & J. W. BARNETT.
BALING PRESS.
APPLICATION FILED FEB. 4, 1914.
1,104,831.
Patented July 28, 1914.
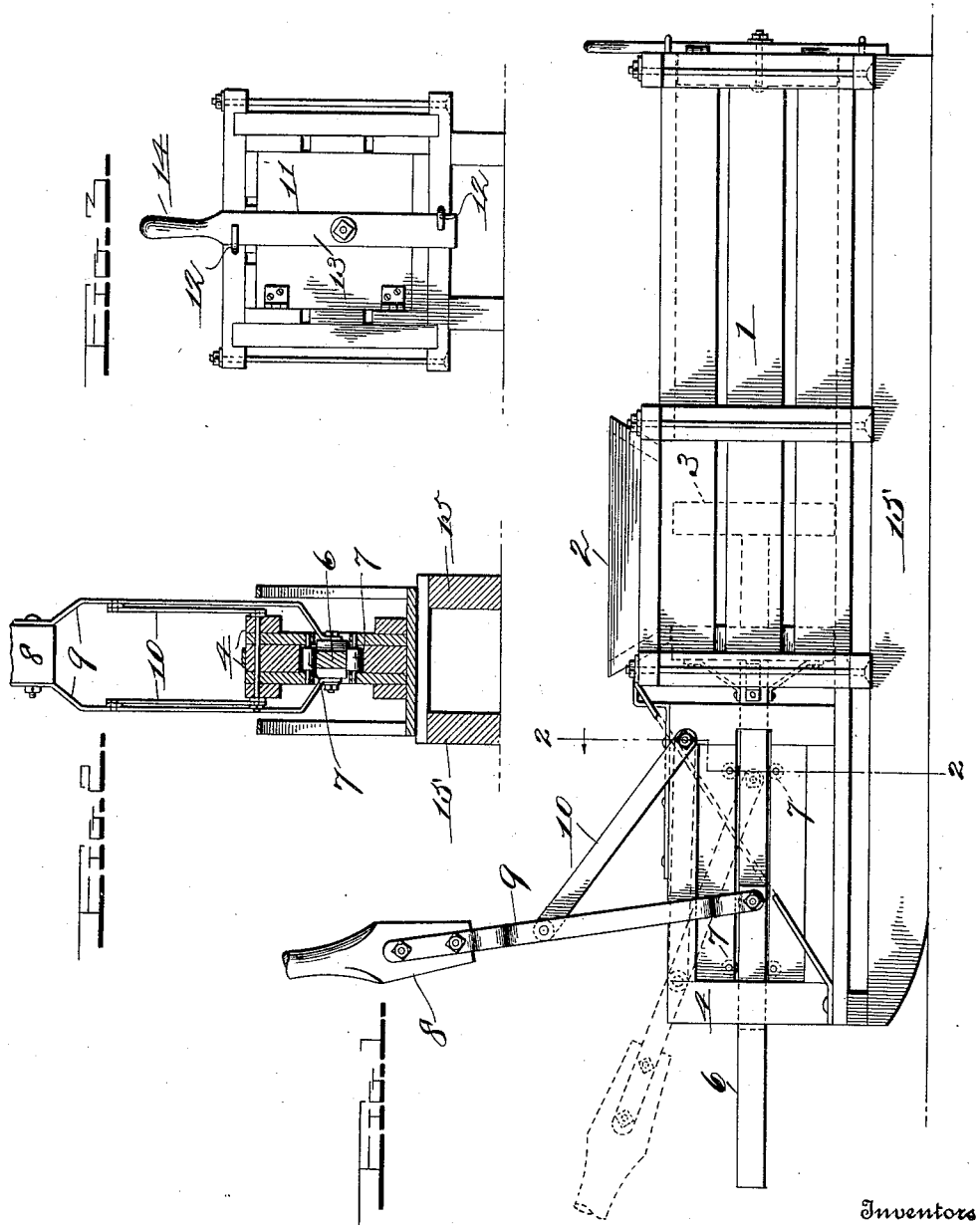
Witnesses
Chas. L. Griesbauer
E. B. McBath
Inventors
R. B. Redding and
J. W. Barnett,
By Chas. E. Brock
Attorney
THE NORRIS PETERS CO., PHOTO-LITHO., WASHINGTON, D. C.

UNITED STATES PATENT OFFICE.

ROBERT BENGIMAN REDDING AND JAMES WILLIAM BARNETT, OF OAKWOOD, TEXAS.

BALING-PRESS.

1,104,831. Specification of Letters Patent. Patented July 28, 1914.

Application filed February 4, 1914. Serial No. 816,645.

*To all whom it may concern:*

Be it known that we, ROBERT B. REDDING and JAMES W. BARNETT, citizens of the United States, residing at Oakwood, in the county of Leon and State of Texas, have invented a new and useful Improvement in Baling-Presses, of which the following is a specification.

This invention relates to a press for baling hay.

The object of the invention is to simplify the construction of presses of this type and to produce a press readily movable from one place to another, and which is strong and durable in construction and readily operated by hand.

The invention consists in the novel features of construction hereinafter described, pointed out in the claims and shown in the accompanying drawings, in which:

Figure 1 is a side elevation, the handle being partly broken away. Fig. 2 is a section on the line 2—2 of Fig. 1. Fig. 3 is a rear end view.

In these drawings 1 represents the baling chamber, 2 the feed hopper and a plunger is shown in dotted lines as indicated at 3. In advance of the feed hopper is arranged a suitable frame 4 which forms a track way for a plunger bar 6, said frame carrying upper and lower rollers 7 between which said bar slides. A suitable operating handle 8 has firmly secured to its lower end portion metal straps 9 which overlap the sides of the frame 4 and which are pivotally secured to opposite sides of the bar 6. Suitable links 10 are pivotally connected to opposite sides of the upper rear portion of the frame 4 and also to the inner faces of the straps 9. When the handle is moved from the position shown in full lines in Fig. 1 to the position shown in dotted lines, the links 10 fold down over the frame 1 resting parallel thereto and upon opposite sides of said frame, while the pivoted ends of the straps 9 move inwardly, thereby carrying with them the bar 6. At the rear end of the baling chamber is a hinged door 11, and oppositely arranged hooks 12 are carried respectively by the upper and lower portions of the end of the baling chamber, and the locking bar 13 is pivoted to the door 11 and has its upper end formed into a handle 14. When the door 11 is closed and the bar 13 moved into a vertical position it will engage the hooks 12 and lock the door in closed position.

In order that the device may be readily moved from place to place it is mounted upon suitable sockets or runners 15.

By means of this construction a very simple and durable press is provided and a very powerful leverage is obtained through the means of connecting the handle 8 to the plunger bar 6 and the frame 4, the bar working very slowly and traveling with very little friction between the upper and lower sets of rollers 7.

What we claim is:—

1. In a baling press a frame forming a track-way, upper and lower sets of rollers adjacent said track-way, a plunger bar working in the track-way and between said rollers, an operating handle pivotally connected to said plunger bar, and links pivotally connected to said frame and also to said handle, said links being adapted to fold upon opposite sides of said frame as the plunger moves inwardly.

2. In a baling press, a suitable frame, a plunger bar adapted to travel in said frame, an operating handle, said handle being provided with suitable members adapted to straddle the frame, and pivotally connected to said bar, links pivotally connected to the upper rear portion of the frame and adapted to fold over the sides of the frame, said links also being pivotally connected to the inner faces of the members of the handle, as and for the purpose set forth.

ROBERT BENGIMAN REDDING.
JAMES WILLIAM BARNETT.

Witnesses:
M. E. DILKEY,
A. P. MCCALL.

Copies of this patent may be obtained for five cents each, by addressing the "Commissioner of Patents, Washington, D. C."